United States Patent
Liu et al.

(10) Patent No.: US 10,229,703 B2
(45) Date of Patent: Mar. 12, 2019

(54) PMR WRITE HEAD WITH PATTERNED LEADING EDGE TAPER

(71) Applicant: Headway Technologies, Inc., Milpitas, CA (US)

(72) Inventors: Ying Liu, San Jose, CA (US); Yuhui Tang, Milpitas, CA (US); Jiun-Ting Lee, Sunnyvale, CA (US); Yue Liu, Fremont, CA (US)

(73) Assignee: Headway Technologies, Inc., Milpitas, CA (US)

( * ) Notice: Subject to any disclaimer, the term of this patent is extended or adjusted under 35 U.S.C. 154(b) by 6 days.

(21) Appl. No.: 15/595,357

(22) Filed: May 15, 2017

(65) Prior Publication Data

US 2018/0330748 A1    Nov. 15, 2018

(51) Int. Cl.
| | | |
|---|---|---|
| *G11B 5/31* | (2006.01) | |
| *G11B 5/11* | (2006.01) | |
| *G11B 5/127* | (2006.01) | |
| *G11B 5/187* | (2006.01) | |
| *G11B 5/235* | (2006.01) | |

(52) U.S. Cl.
CPC ............ *G11B 5/112* (2013.01); *G11B 5/1278* (2013.01); *G11B 5/187* (2013.01); *G11B 5/235* (2013.01); *G11B 5/313* (2013.01); *G11B 5/315* (2013.01); *G11B 5/3116* (2013.01); *G11B 5/3143* (2013.01); *G11B 5/3169* (2013.01)

(58) Field of Classification Search
CPC ............................... G11B 5/315; G11B 5/1278
USPC ..................................................... 360/125.3
See application file for complete search history.

(56) References Cited

U.S. PATENT DOCUMENTS

| | | | |
|---|---|---|---|
| 7,268,974 B2 | 9/2007 | Lille | |
| 7,952,831 B2 | 5/2011 | Kim et al. | |
| 7,969,684 B2 * | 6/2011 | Le ....................... | G11B 5/1278 360/125.13 |
| 8,111,479 B2 | 2/2012 | Chen et al. | |
| 8,284,516 B1 | 10/2012 | Tang et al. | |
| (Continued) | | | |

OTHER PUBLICATIONS

Effect of 3d, 4d, and 5d transition metal doping on damping in permalloy thin films, by J. O. Rantschler et al., Journal of Applied Physics 101, 033911, Feb. 14, 2007, pp. 1-5.

(Continued)

*Primary Examiner* — Jefferson Evans
(74) *Attorney, Agent, or Firm* — Saile Ackerman LLC; Stephen B. Ackerman (57) ABSTRACT

A perpendicular magnetic recording writer is disclosed with an all wrap around (AWA) shield design in which a surface of the leading shield that contacts the lead gap is comprised of a notch that is recessed 20 to 120 nm from the air bearing surface (ABS) and has a first side with a down-track dimension of 20-200 nm that is aligned parallel to the ABS. In one embodiment, the notch is aligned below the main pole leading side and has a cross-track width substantially the same as the track width of the main pole trailing side. The notch has two sidewalls formed equidistant from a center plane that bisects the leading shield wherein each sidewall intersects the first side at an angle of 90 to 170 degrees. Accordingly, overwrite and bit error rate are improved while adjacent track interference and tracks per square inch capability are substantially maintained.

20 Claims, 8 Drawing Sheets

(56) References Cited

U.S. PATENT DOCUMENTS

| | | | |
|---|---|---|---|
| 8,310,787 B1 * | 11/2012 | Sasaki | G11B 5/1278 360/125.3 |
| 8,427,781 B1 | 4/2013 | Sasaki et al. | |
| 8,542,461 B2 | 9/2013 | Bai et al. | |
| 8,582,238 B1 | 11/2013 | Liu et al. | |
| 8,749,919 B2 | 6/2014 | Sasaki et al. | |
| 8,767,347 B1 * | 7/2014 | Sasaki | G11B 5/315 360/123.06 |
| 8,879,208 B1 | 11/2014 | Liu et al. | |
| 8,941,948 B2 * | 1/2015 | Etoh | G11B 5/23 360/119.03 |
| 9,082,433 B1 | 7/2015 | Tang et al. | |
| 9,361,912 B1 | 6/2016 | Liu et al. | |
| 9,466,319 B1 | 10/2016 | Tang et al. | |
| 9,508,364 B1 | 11/2016 | Tang et al. | |
| 9,824,700 B1 * | 11/2017 | Aritomo | G11B 5/1272 |
| 10,014,021 B1 * | 7/2018 | Liu | G11B 5/1278 |
| 2007/0171575 A1 | 7/2007 | Lim et al. | |
| 2013/0027809 A1 | 1/2013 | Min et al. | |
| 2013/0100555 A1 * | 4/2013 | Sasaki | G11B 5/1278 360/244 |
| 2013/0155550 A1 * | 6/2013 | Sasaki | G11B 5/1278 360/244 |
| 2013/0335847 A1 | 12/2013 | Shiroishi | |

OTHER PUBLICATIONS

"Magnetic Damping in Ferromagnetic Thin Films," by Mikihiko Oogane et al., Japanese Journal of Applied Physics, vol. 45, No. 5A, May 2006, pp. 3889-3891.

* cited by examiner

PMR WRITE HEAD WITH PATTERNED LEADING EDGE TAPER

This application is related to the following: U.S. Pat. No. 9,508,364; and Ser. No. 15/595,338, filing date May 15, 2017; assigned to a common assignee and herein incorporated by reference in their entirety.

TECHNICAL FIELD

The present disclosure relates to a leading shield structure in a PMR write head wherein a notch is formed in a side of the leading shield adjoining the lead gap and facing the main pole to enhance overwrite (OW) performance, lower the bit error rate (BER), and improve bits per inch (BPI) capability with minimal tradeoff in tracks per inch (TPI) capability or adjacent track interference (ATI) for both conventional and shingle magnetic recording applications.

BACKGROUND

Perpendicular magnetic recording has been developed in part to achieve higher recording density than is realized with longitudinal recording devices. A PMR write head typically has a main pole layer with a small surface area at an air bearing surface (ABS), and coils that conduct a current and generate a magnetic flux in the main pole such that the magnetic flux exits through a write pole tip and enters a magnetic medium (disk) adjacent to the ABS. Magnetic flux is used to write a selected number of bits in the magnetic medium and typically returns to the main pole through two pathways including a trailing loop and a leading loop where both involve a shield structure. The trailing loop comprises a trailing shield structure with first and second trailing shields each having a front side at the ABS. The leading loop includes a leading shield with a front side at the ABS and connected to a return path proximate to the ABS. The return path extends to the back gap connection and enables magnetic flux in the leading loop pathway to return from the leading shield through the back gap connection to the main pole layer.

For both conventional (CMR) and shingle (SMR) magnetic recording, continuous improvement in storage area density is required for a PMR writer. A write head that can deliver or pack higher bits per inch (BPI) and higher tracks per inch (TPI) is essential to the area density improvement. A fully wrapped around shield design for a PMR write head is desired where the trailing shield is responsible for improving down track field gradient while side shields and a leading shield enhance the cross track field gradient and TPI as well as improve adjacent track erasure (ATE) also known as ATI.

The key to an optimized PMR writer structure is the capability to control distribution of magnetic flux from the main pole to each shield. Ideally, better control of magnetic flux in the near field or proximate to the main pole is desirable to achieve an enhanced near field gradient and to realize higher area density capability (ADC). Typically, flux distribution is controlled by changing the magnetic saturation (Ms) of materials in the shields, and by modifying geometries (size and shape) of the shields. In today's PMR design, most shield optimization efforts have focused on the side shields and trailing shield, and substantially less emphasis on the leading shield. However, in order to achieve higher performance capability associated with PMR writers that require higher TPI capability to at least 400K/in$^2$ for CMR and at least 500K/in$^2$ for SMR, a better design is needed for the leading shield structure.

SUMMARY

One objective of the present disclosure is to provide leading shield design for a PMR writer that enables a means of improving overwrite (OW), BPI, and bit error rate (BER) while substantially maintaining ATI and TPI.

Another objective of the present disclosure is to provide a method of forming the leading shield of the first objective that is readily implemented in a manufacturing environment.

According to a first embodiment, these objectives are achieved with a PMR writer that has an all wrap around (AWA) shield structure wherein a patterned leading shield, side shields, and trailing shield surround a main pole at the ABS, and adjoin a lead gap, side gap, and write gap, respectively. However, the patterned leading shield is not limited to an AWA shield structure in order to deliver improved PMR writer performance as described herein. In one embodiment, the main pole has tapered leading side that extends from the ABS to a back end at a first corner where the tapered leading side intersects with a front end of a main pole leading side formed orthogonal to the ABS. Likewise, the main pole may have a tapered trailing side that extends from the ABS to a second corner where the tapered trailing side intersects with a main pole trailing side formed orthogonal to the ABS.

In all embodiments, a key feature is the leading shield structure that has an upper layer with a patterned side facing the main pole leading side at the lead gap, and a lower layer with a rectangular shape, and a second height and cross-track width equal to that of the upper layer. From a down-track cross-sectional view in the exemplary embodiment, a first section of the patterned leading shield side has a first end at the ABS and extends substantially parallel to the main pole tapered leading side to a first height from the ABS. At the first height, there is a notch having a first side formed parallel to a front side of the patterned leading shield layer at the ABS. The first side extends a down-track distance "t" to a second side of the notch that is aligned orthogonal to the ABS and coincides with a top surface of the lower layer. The second side extends from the first height to a second height at a backside of the leading shield. In a preferred embodiment, the patterned leading shield backside is aligned parallel to the ABS.

From a top-down perspective from the main pole tapered leading side, the notch has a rectangular shape with two parallel sides extending from the first side at the first height to the backside at the second height where each parallel side is equidistant from a center plane that bisects the leading shield and main pole. There is a cross-track width w1 between the two parallel sides where w1 is substantially the same as the track width of the main pole trailing side at the ABS.

From an ABS view, the main pole may have a trapezoidal shape wherein a trailing side has a track width (TW) that is greater than a cross-track width of the leading side. Moreover, each of the side shield layers has a main pole facing side that adjoins a side gap layer and is essentially parallel to the nearest main pole side. A high Ms (19-24 kG) magnetic layer hereafter called the hot seed layer adjoins a top surface of the write gap and is part of the trailing shield structure. In an AWA shield design, a trailing shield layer is formed on a top surface of the hot seed layer, adjoins the sides of the write gap and hot seed layer, and contacts a top surface of the side shield on each side of the main pole. The notch in the patterned leading shield is recessed a first height distance behind the ABS, and is aligned below the main pole leading side.

The patterned leading shield layer serves to release additional main pole flux from the leading side of the main pole thereby boosting overwrite capability when writing a bit on the magnetic medium. Thereafter, a substantial portion of the additional flux returns through the trailing loop to the main pole and enhances trailing shield response. Because of reduced volume in the patterned leading shield layer behind the ABS, higher OW and better BPI is achieved. Since leading shield volume is preserved proximate to the ABS, ATI and side shield response are maintained.

In a preferred embodiment, the first side of the notch in the patterned leading shield layer is recessed a first height of 20 to 120 nm from the ABS while the down-track thickness "t" of the first side is from 20 nm to 200 nm, and the cross-track width w1 of the notch is between 100 nm and 1 micron.

A method for forming the patterned side shield is also provided and includes forming the lower leading shield layer in a dielectric layer, and depositing the upper leading shield layer on a top surface of the lower leading shield layer and dielectric layer. Then a conventional photoresist patterning and etching sequence is performed to form a backside on the upper layer at a second height from the eventual ABS, and to form a notch therein having a cross-track width w1 at the center plane that bisects the leading shield. Subsequently, a second photoresist patterning and etching sequence is used to form a taper on a top surface of the upper layer thereby determining a final thickness "t" of the first side.

DETAILED DESCRIPTION

The present disclosure relates to a leading shield design where a side of the leading shield that adjoins the lead gap and faces the main pole layer is patterned to enable additional magnetic flux from the main pole leading side to improve OW and BER when writing a bit on a magnetic medium that is proximate to the ABS. The exemplary embodiments depict a main pole with a tapered leading side and tapered trailing side. However, the present disclosure also anticipates that one or both of the main pole leading side and trailing side proximate to the ABS are not tapered but are formed along a plane that is orthogonal to the ABS. In the drawings, the y-axis is a cross-track direction, the z-axis is a down-track direction, and the x-axis is in a direction orthogonal to the ABS and towards a back end of the PMR writer. Thickness refers to a down-track distance, width is a cross-track distance, and height is a distance in a direction orthogonal to the ABS. It should be understood that the patterned leading shield design described herein is compatible with a variety of PMR writer structures and is not limited to the PMR writer depicted in FIG. 1.

Figure 1:
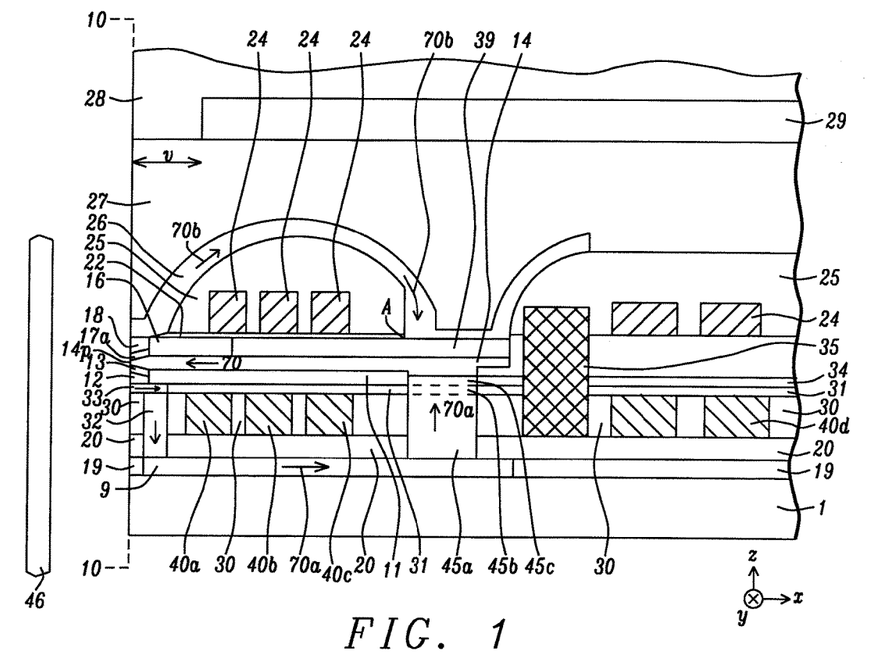
FIG. 1 is a down-track cross-sectional view showing a PMR writer that has a double write shield (DWS) design with two flux return pathways to the main pole.

Referring to FIG. 1, a PMR writer currently fabricated by the inventors according to a process of record (POR) is depicted in a down-track cross-sectional view from a plane that is orthogonal to ABS 10-10 and passes through the main pole layer 14. The PMR writer is formed on a substrate 1 that may comprise a read head in a combined read/write head, for example. The substrate is typically part of a slider (not shown) formed in an array of sliders on a wafer. After the PMR writer is completed, the wafer is sliced to form rows of sliders. Each row is typically lapped to afford an ABS before dicing to fabricate individual sliders that are used in magnetic recording devices.

A return path (RTP) layer 9 may also serve as a S2B shield in the underlying read head in an embodiment where the PMR writer is part of a combined read/write head as appreciated by those skilled in the art. The RTP layer is recessed from the ABS 10-10 but is able to transmit flux from magnetic medium 46 to main pole 18 through the leading loop return pathway that may include a leading shield 12, leading shield connector (LSC) 33, S2C shield 32, the RTP, and a back gap connection (BGC) comprised of magnetic sections 45a-45c. In other embodiments, one or both of the LSC and S2C layers may be omitted such that the leading shield contacts the RTP layer.

The BGC may be depicted with three sections formed in a laminated manner and represented by stack 45a/45b/45c wherein a bottommost (lower) section 45a contacts a top surface of RTP 9, and an uppermost section 45c contacts a back portion of the bottom surface of main pole 14. In the exemplary embodiment, there is a first insulation layer 20 formed on the RTP and having an ABS facing side adjoining a bottom portion of the S2C 32 back side, and a back side abutting an ABS facing side of BGC lower section 45a. A second insulation layer 30 is formed on the first insulation layer and extends orthogonal to the ABS from an upper portion of the S2C back side to an ABS facing side of BGC section 45b. In some embodiments, a bucking coil layer with three turns 40a-40c is formed within the second insulation layer and between the S2C backside and BCG section 45b. However, the present disclosure also anticipates that a bucking coil layer with one turn, two turns, or four turns in a 1+1T, 2+2T, or 4+4T configuration may be employed as appreciated by those skilled in the art. Bucking coils are wound in series with an opposite polarity to that in the driving coils 24 to minimize direct coupling between the first trailing shield 18 and driving coils. A top surface of the bucking coil layer is preferably coplanar with a top surface of the second insulation layer, a top surface of BGC section 45a, and a top surface of S2C shield 32. The second insulation layer 30 may also be formed between the ABS 10-10 and an upper portion of the ABS facing side of S2C shield 32. First insulation layer 20 may be formed between the ABS and a bottom portion of the ABS facing side of the S2C shield. RTP 9 is formed within insulation layer 19 and is recessed a certain distance from the ABS. Insulation layers 19, 20, 30 are comprised of a dielectric material and the bucking coil layer 40a-40c is typically a conductive material such as Cu. In the process of record (POR) practiced by the inventors, leading shield 12, LSC 33, S2C, back gap connection 45a-45c, and RTP 9 may be made of CoFeN, NiFe, CoFe, CoFeNi with a saturation magnetization (Ms) value of 10 kG to 16 kG.

A third insulation layer 31 contacts the top surface of the bucking coil turns 40a-40c and the second insulation layer 30 between a back side of LSC 33 and an ABS facing side of BGC section 45c. A fourth insulation layer 11 is formed on the third insulation layer and on a back end portion of the LSC. The fourth insulation layer extends from a backside of the leading shield 12 to an ABS facing side of uppermost BGC section 45c. According to one embodiment, first through second insulation layers have a combined thickness in a down-track direction substantially the same as BGC section 45a, while the third insulation layer has a thickness essentially the same as BGC section 45b. In some embodiments, a bottom yoke (not shown) is provided between a lead gap 13 and a back portion of the main pole that adjoins the top surface of BGC section 45c. In the exemplary embodiment, insulation layer 11 is also formed behind the lead gap and leading shield.

Above insulation layer 36 is the main pole 14 that may be comprised of CoFe, NiFe, CoFeNi or another magnetic material with a Ms of 19-24 kG. The main pole has a write pole tip 14p at the ABS 10-10, and extends toward the back end of the device where a back portion is magnetically connected with BGC section 45c. The leading shield is separated from the main pole by the lead gap 13. Flux from the main pole enters a magnetic medium 46 and returns in part as flux 70a though the leading loop comprised of LS 12, LSC 33, S2C 32, RTP 9, and BGC 45a-45c.

Returning to FIG. 1, the first trailing shield structure may include a lower magnetic (hot seed) layer with front portion 17a on write gap (not shown), and back portion 17b above a trailing side of the main pole 14. An upper layer in the first trailing shield structure is magnetic layer 18 that adjoins a bottom surface of an overlying second trailing shield also known as PP3 trailing shield 26. The trailing shield structure serves as a flux return pathway 70b wherein flux from a magnetic medium enters the first trailing shield and passes through the PP3 trailing shield to a back portion of main pole 14. The first trailing shield layer 18 and PP3 trailing shield are typically made of 10-19 kG materials.

There is a top yoke 39 contacting a portion the top surface of the main pole 14. The top yoke and bottom yoke (when present) transmit magnetic flux to the main pole where the flux 70 is concentrated at main pole tip 14p. The top yoke extends to a backside at point A where the top yoke touches the inner corner of PP3 26 above a back portion of the main pole. A bottom yoke may be included in the write head structure to provide a faster writer response compared with designs where only a top yoke is employed. An insulation layer 22 is formed on a portion of the non-magnetic layer 16 and top yoke behind trailing shield layer 18. A current is passed through driving coil layer 24 that is disposed on the insulation layer 22 to generate magnetic flux in the top yoke and main pole. The driving coil layer 24 may have one or a plurality of turns. Three turns are depicted above the main pole in this embodiment. Bucking coils are connected to driving coils through connector 35 that is a greater distance from the ABS than BGC 45.

In the exemplary embodiment, the PP3 trailing shield arches over driving coil layer 24 and connects with the top surface of the top yoke above the BGC 45c. The PP3 trailing shield may have a dome shape as in the exemplary embodiment or may have a planar top surface that is parallel to a top surface of the main pole. An insulation layer 25 is formed on the insulation layer 22 and fills the openings between the turns of driving coil layer 24 and the space between a top surface of the driving coils and a bottom surface of the PP3 shield layer 26. A protection layer 27 covers the PP3 trailing shield and is made of an insulating material such as alumina. Above the protection layer and recessed a certain distance from the ABS 10-10 is an optional cover layer 29 that is preferably comprised of a low CTE material such as SiC that serves to reduce the WG protrusion rate. The SiC cover layer is recessed to avoid introducing a material at the ABS with different mechanical and etch resistance properties than adjacent layers which could adversely affect back end lapping and ion beam etching processes. An overcoat layer 28 is formed as the uppermost layer in the write head.

There are two pathways for magnetic flux to return to the write head from magnetic medium 46. For example, magnetic flux 70 from main pole 14 exits through write pole tip 14p into a magnetic medium and may return via leading loop 70a as described previously. Flux from the magnetic medium also returns to the write head via pathway 70b by entering hot seed layer 17a at the ABS and then passing through write shield 18 and PP3 trailing shield 26 before reaching the main pole. The dual flux return pathway in the POR design is employed to reduce side track erasure (STE).

Figure 2A:
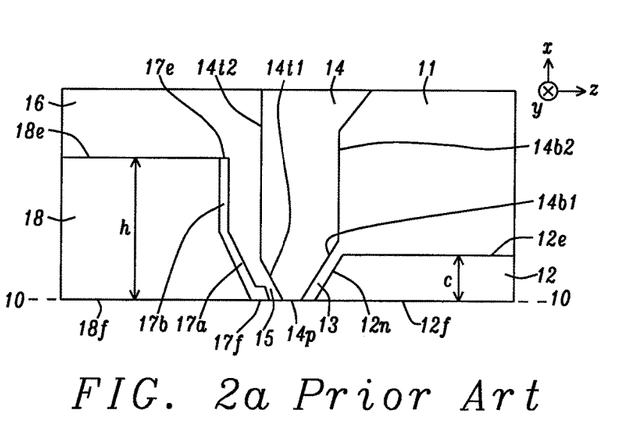
FIG. 2a is a down-track cross-sectional view of a main pole proximate to an ABS where a leading shield side adjoining a lead gap is formed substantially parallel to a tapered leading side of the main pole according to a prior art design.

Referring to FIG. 2a, a down-track cross-sectional view of the PMR writer in FIG. 1 is depicted with a conventional leading shield 12. The leading shield adjoins a bottom surface of lead gap 13 and has a planar side 12n that faces tapered leading side 14b1 of the main pole 14. Side 12n extends from the ABS 10-10 to a height c at leading shield backside 12e, which is parallel to the front side 12f at the ABS. The hot seed layer has a first portion 17a facing main pole tapered trailing side 14t1 and with a front side 17f at the ABS, and a second portion 17b connected to a back end of the first portion and aligned parallel to main pole trailing side 14t2. Trailing shield 18 adjoins the hot seed layer portions 17a, 17b on sides thereof facing away from the write gap 15, and has a front side 18f at the ABS and a backside 18e at a second height h from the ABS where h>c.

Figure 2B:
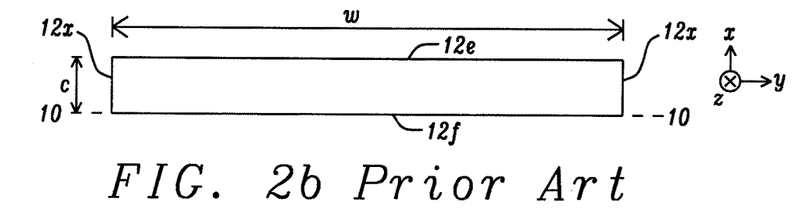
FIG. 2b shows a top-down view of the leading shield in FIG. 2a from a perspective at the main pole tapered leading side, and shows the leading shield backside is planar, and is parallel to the leading shield front side at the ABS.

In FIG. 2b, leading shield 12 in FIG. 2a is pictured from a top down (down-track) perspective from main pole tapered leading side 14b1 with and with lead gap 13 removed. The leading shield backside 12e has a cross-track width w between far sides 12x, and is planar with a surface that is uninterrupted by any openings.

In related U.S. Pat. No. 9,508,364, we disclosed how greater area density capability (ADC) and writer speed are realized in a PMR writer by modifying a conventional leading shield as well as the trailing shield, and side shields in a AWA shield configuration to include a 19 kG to 24 kG magnetic material with a damping parameter α of ≥0.04. Now we have discovered that further improvement in PMR writer performance is achieved through a leading shield shape involving a patterned side that faces the main pole leading side and adjoins the lead gap layer.

In related U.S. Pat. No. 15/595,338, we disclosed how a lower portion of a leading shield is patterned with a notch that is recessed from the ABS and bisected by a center plane. Thus, a PMR writer is formed with improved TPI while substantially maintaining BPI that results in a net ADC gain. In some PMR writer designs, there is a need for greater BPI without a significant tradeoff in lower TPI for an overall net ADC improvement. Now, we have discovered a patterned leading shield structure to satisfy the aforementioned requirement.

Figure 3A:
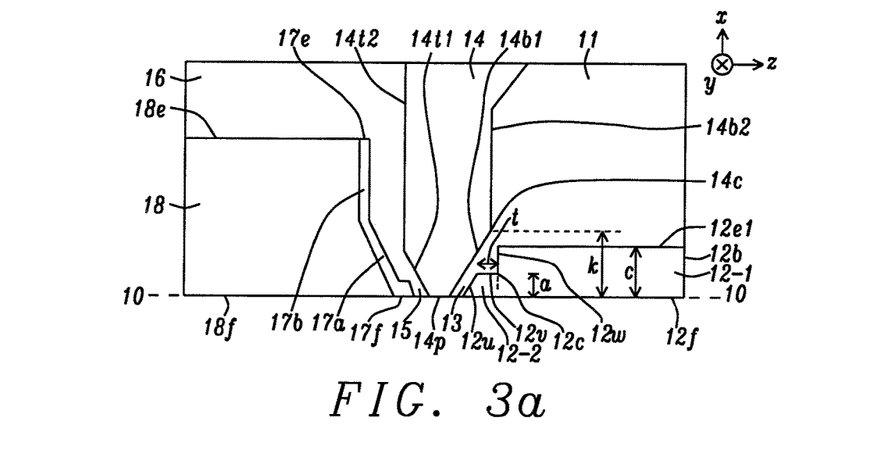
FIG. 3a is a down-track cross-sectional view of a PMR writer wherein a patterned leading shield layer with a tapered side at the lead gap has a notch that is recessed from the ABS according to an embodiment of the present disclosure.

Referring to FIG. 3a, a leading shield is depicted with a patterned upper layer 12-2 and a rectangular shaped lower layer 12-1 according to one embodiment of the present disclosure. The down-track cross-sectional view is taken along a center plane (plane 42-42 in FIG. 3c) that bisects the main pole and leading shield. The trailing shield structure comprised of hot seed layer portions 17a, 17b and magnetic layer 18 is retained from the POR structure illustrated in FIG. 2a. However, the present disclosure anticipates that other trailing shield structures used in the art may replace the POR scheme and yet enable all of the benefits of the patterned leading shield design in the exemplary embodiment.

According to the exemplary embodiment, main pole 14 has a tapered leading side 14b1 extending from the ABS 10-10 to a second leading side 14b2 that is aligned orthogonal to the ABS as described previously. The leading sides 14b1, 14b2 intersect at corner 14c corresponding to an end of the tapered leading side that is at height k from the ABS. Moreover, the main pole retains a tapered trailing side 14t1 extending from the ABS to a second trailing side 14t2 aligned parallel to side 14b2 as previously indicated. Dielectric layer 11 contacts the backside 12e1 of leading shield layer 12-1 while dielectric layer 16 adjoins the backsides 17e, 18e of hot seed layer portion 17b and trailing shield 18, respectively, behind write gap 15. Lead gap 13 has a front side at the ABS.

A key feature of the leading shield design of the present disclosure is that the upper layer 12-2 adjoining the lead gap 13 is modified to include a notch having a first side 12v formed parallel to the ABS 10-10, and a second side 12w aligned orthogonal to the ABS from a down-track cross-sectional view. The second side coincides with a portion of the top surface of lower layer 12-1. Moreover, the upper layer has a third side 12u that is tapered and aligned substantially parallel to the main pole tapered leading side. The third side extends from the ABS to a back end at first height a, which is 20 to 120 nm from the ABS. First side 12v extends from the back end of third side 12u for a down-track distance t of 20 to 200 nm. Second side 12w extends from an end of side 12v at corner 12c of the notch to backside 12e1 that is at height c of 100 to 300 nm from the ABS. In the exemplary embodiment, c>a and c<k. However, in some embodiments, c may be greater than k. Both of the upper layer and lower layer have a front side 12f at the ABS. Back side 12e1 extends from an end of side 12w at height c to the leading shield bottom surface 12b.

Figure 3B:
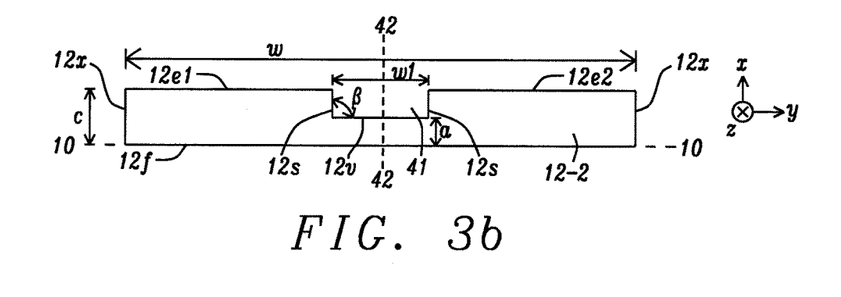
FIG. 3b is top-down view of the patterned leading shield layer in FIG. 3a from a perspective at the main pole tapered leading side, and shows the notch with a rectangular shape according to an embodiment of the present disclosure.

Referring to FIG. 3b, a top-down view of the patterned leading shield upper layer 12-2 in FIG. 3a is shown from a perspective at the main pole tapered leading side 14b1 with the lead gap removed. The notch is filled with a dielectric layer 41 such as $SiO_2$ and has a cross-track width w1 from 100 nm to 1 micron between two sidewalls 12s that each connect an end of first side 12v with a backside section 12e1 or 12e2. In the exemplary embodiment, angle β that is formed by the intersection of each sidewall 12s with first side 12v is 90°. However, the present disclosure anticipates angle β may be greater than 90° and up to 170° such that the cross-track distance at the top of the notch between backside sections 12e1 and 12e2 is greater than distance w1 at the base, which is the width of first side 12v. The notch is bisected by center plane 42-42 that also bisects main pole leading side 14b1 and trailing side 14t1 in a down-track direction (FIG. 3c) such that each sidewall 12s is ½ w1 from the center plane. In the exemplary embodiment, w1 is aligned below the main pole tip 14p in a down-track direction, and w1 is substantially equal to the track width (TW) at the trailing side of the main pole. In some embodiments, w1 may have a value between 1× and 5× that of TW and still provide the benefits of higher BPI, better OW and BER while substantially maintaining TPI and ATI for a net ADC improvement.

Figure 3C:
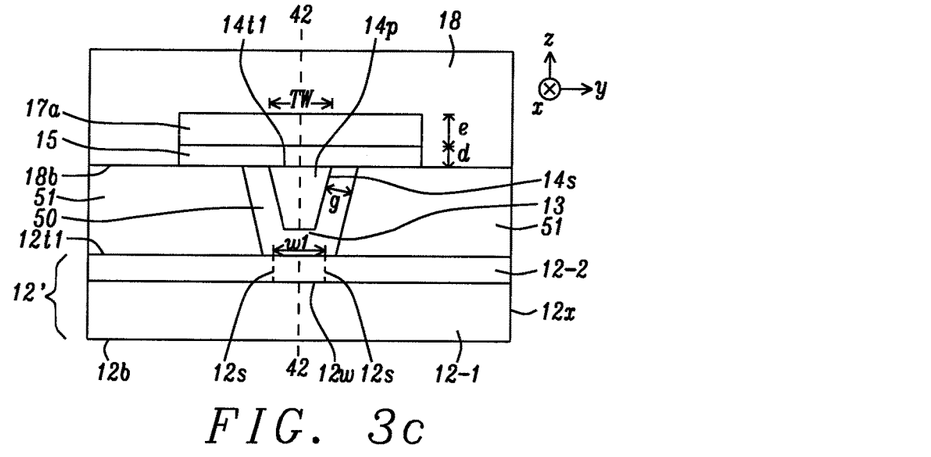
FIG. 3c is an ABS view of an all wrap around (AWA) shield structure comprised of a patterned leading shield layer with a recessed notch according to an embodiment of the present disclosure.

Referring to FIG. 3c, an ABS view of an all wrap around (AWA) shield embodiment is shown where the shield structure comprising side shields 51, trailing shield 18, and leading shield 12' comprised of lower layer 12-1 and upper layer 12-2 completely surrounds the main pole tip 14p. Note that the view in FIG. 3a is taken along center plane 42-42 in FIG. 3c. The leading shield top edge 12t1 is not shown in FIG. 3a but is the location where side 12u ends at the ABS 10-10. In FIG. 3c, side shields 51 adjoin a side of the side gap 50 that is a side gap distance g from each main pole side 14s. Each side shield adjoins the top edge 12t1 of the leading shield, and contacts a bottom surface 18b of the trailing shield at the ABS. Write gap 15 has a thickness d, and a greater cross-track width than track width TW of the write pole 14. The write gap contacts a top surface (trailing side)

14b of the write pole tip in addition to top surfaces of side gaps 50 and side shields 51. Trailing shield hot seed layer 17a may have a cross-track width that is essentially equivalent to that of the write gap, and has a thickness e. Side shields and trailing shield 18 may be comprised of a 10-19 kG magnetic material such as CoFe, CoFeNi, FeNi, and CoFeN. Leading shield sidewalls 12s and side 12w are recessed behind the ABS in this view. Lead gap 13 has a front side at the ABS that contacts main pole leading side 14b1, and adjoins top edge 12t1.

In one embodiment, leading shield 12' is made of CoFe, CoFeNi, or CoFeN. In other embodiments, the patterned leading shield may comprise a high damping material with a damping parameter $\alpha \geq 0.04$ that is an alloy such as FeNiM, FeCoM, or FeCoNiM where M is one of Re, Os, Ir, Rh, Ti, Ta, V, Cr, W, Mn, Mo, Cu, Zr, Nb, Hf, Ru, Pd, Pt, Ag, and Au as disclosed in related U.S. Pat. No. 9,508,364.

Figure 4A:
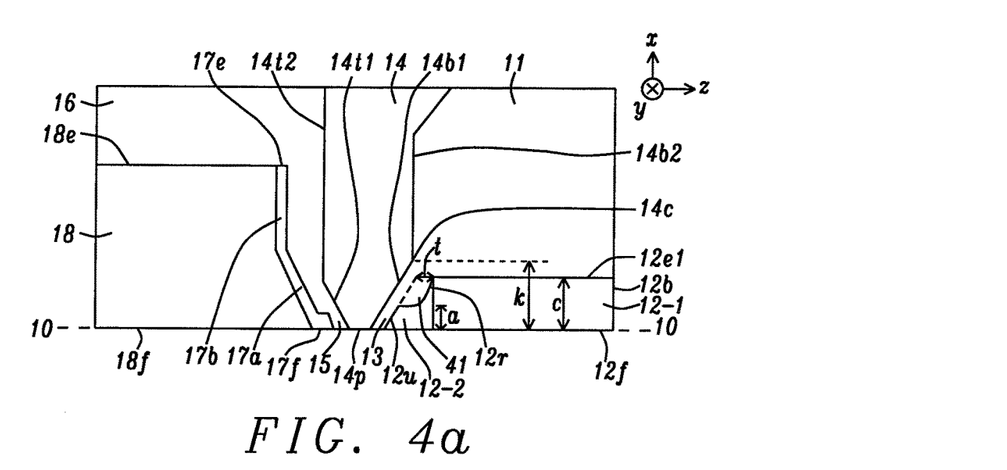
FIG. 4a is a down-track cross-sectional view of a PMR writer wherein a patterned leading shield layer with a tapered side at the lead gap has a curved notch according to a second embodiment of the present disclosure.

Referring to FIG. 4a, the present disclosure also encompasses a second embodiment that retains all aspects of the first embodiment including the leading shield bilayer structure and composition from FIG. 3a except the shape of the notch is modified from one having a square corner to a curved notch having a curved side 12r that extends from a back end of tapered side 12u at height a to backside 12e1 at height c where c>a. Thus, a first portion of the curved side proximate to side 12u is aligned substantially parallel to the ABS 10-10 while a second portion thereof proximate to the backside is substantially parallel to the main pole tapered leading side. It should be understood that due to limitations in fabricating the notch with dimensions a and t around 100 nm or less, a certain amount of rounding may occur during a photolithography process that transfers a notch pattern with a square corner on a quartz mask into a photoresist masking layer formed on the leading shield as explained later. Furthermore, a subsequent etch process required to transfer the pattern from the photoresist masking layer into the leading shield may duplicate a rounded notch shape in the upper layer 12-2. Preferably, the down-track dimension t of the notch is substantially maintained.

Figure 4B:
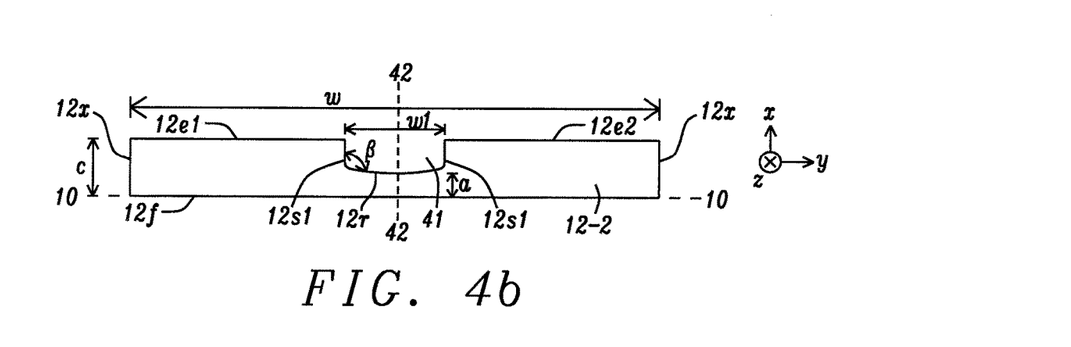
FIG. 4b is top-down view of the leading shield patterned layer in FIG. 4a from a perspective at the main pole tapered leading side, and shows the curved notch has a substantially rectangular shape.

In FIG. 4b, a top-down view of the notch with curved side 12r in FIG. 4a is illustrated. According to one embodiment, the cross-track width w1 between backside sections is maintained when angle β is 90° between curved side 12r at center plane 42-42 and upper portions of sides 12s1. However, lower portions of sides 12s1 proximate to side 12r also exhibit a certain amount of rounding and are not parallel to center plane 42-42. It should be understood that even with a curved side 12r, the notch provides essentially the same benefits as in the first embodiment because the cross-track width w1 and depth t of the curved notch are substantially the same as in the first embodiment. The notch is filled with dielectric layer 41 described previously.

The present disclosure also encompasses a method of forming a PMR writer having an AWA shield design with a patterned top surface in a leading shield layer that faces the main pole according to an embodiment described herein. Only the process steps associated with leading shield formation are described. The remainder of the PMR fabrication sequence comprises conventional steps that are well known in the art and are not described herein.

Figure 5A:
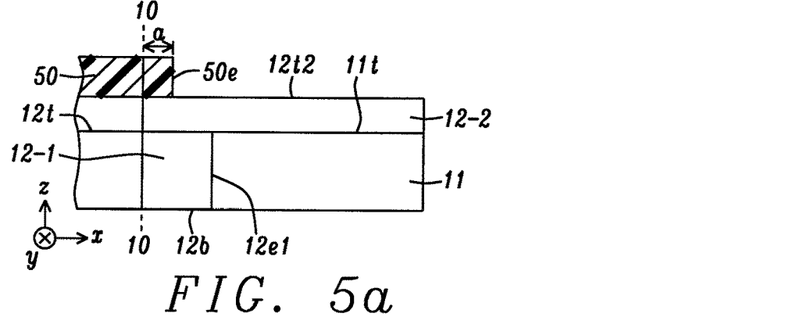
FIG. 5a and FIG. 6a are down-track cross-sectional views depicting a sequence of steps in forming a patterned leading shield layer with a notch according to an embodiment of the present disclosure.

From a down-track cross-sectional perspective that depicts plane 10-10 (the eventual ABS location) in FIG. 5a, leading shield (LS) lower layer 12-1 is provided as a substrate, and a top surface 12t thereof is coplanar with top surface 11t of dielectric layer 11 that adjoins backside 12e1 of the LS lower layer. The LS lower layer is formed within the dielectric layer by a conventional method. Note that plane 10-10 is orthogonal to top surface 11t. As appreciated by those skilled in the art, the ABS will not be determined until all layers in the PMR writer are formed, and a lapping process is performed. LS upper layer 12-2 with top surface 12t2 may be plated on the LS lower layer and on the adjoining dielectric layer. Next, a photoresist layer 50 is coated and is patternwise exposed and developed by a conventional method to generate a backside 50e thereby exposing LS upper layer top surface 12t2 at a height >a from the eventual ABS.

Figure 5B:
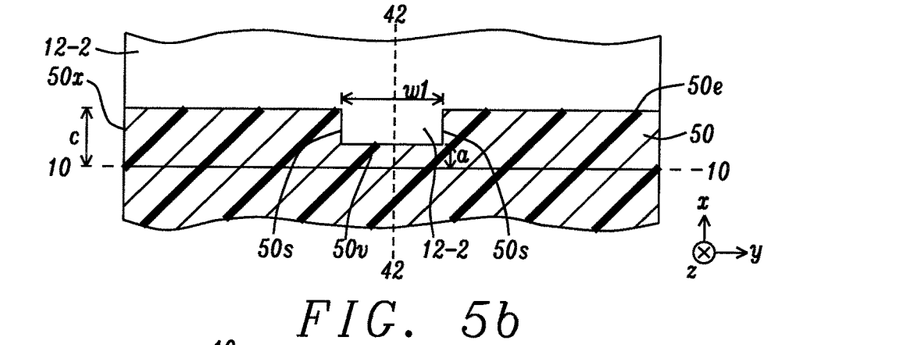
FIG. 5b and FIG. 6b are top-down views of the partially formed leading shield layer depicted in FIG. 5a and FIG. 6a, respectively.

Referring to FIG. 5b, a top-down view of the photoresist layer 50 in FIG. 5a is shown. Sides 50s and side 50v form a notch having a cross-track width w1, and there is a height c between the eventual ABS 10-10 and backside 50e of the photoresist layer. Sides 50x are aligned above the desired location of sides 12x in the final patterned leading shield structure. Likewise, sides 50s and side 50v will determine the position of sides 12s and side 12v, respectively, in the patterned leading shield layer 12-2. In some embodiments, the intersection of each side 50s with side 50v may form a curved shape due to limitations in the photoresist patterning process, especially when down-track dimension t approaches 20 nm.

Figure 6A:
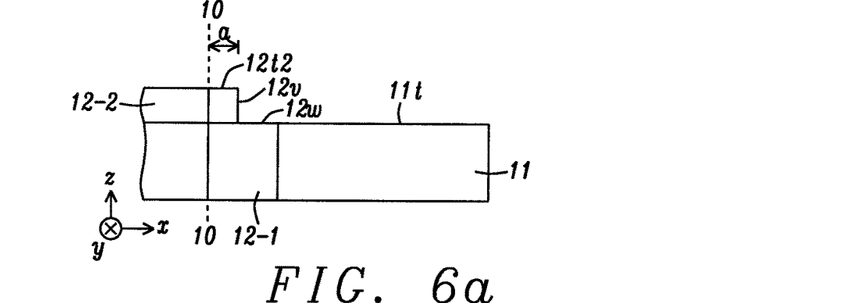

In FIG. 6a, the partially formed leading shield structure is depicted after an etch process is employed to remove exposed portions of LS upper layer 12-2 that are not protected by photoresist layer 50. The etch process end point is reached when top surface 11t of dielectric layer is uncovered. Preferably, the etch process also stops at top surface portion 12w of LS lower layer 12-1 within the notch opening. Etch process conditions are usually controllable to the extent that a square corner formed by sides 50s, 50v in the photoresist layer is essentially duplicated in upper layer 12-2 as a square corner between sides 12s, 12v. Thereafter, the photoresist layer is stripped by a well known method. As a result, first side 12v is formed at a backside of the LS upper layer at height a from the eventual ABS 10-10. Also, a top surface portion 12t2 of LS upper layer 12-2 is uncovered between first side 12v and plane 10-10.

Figure 6B:
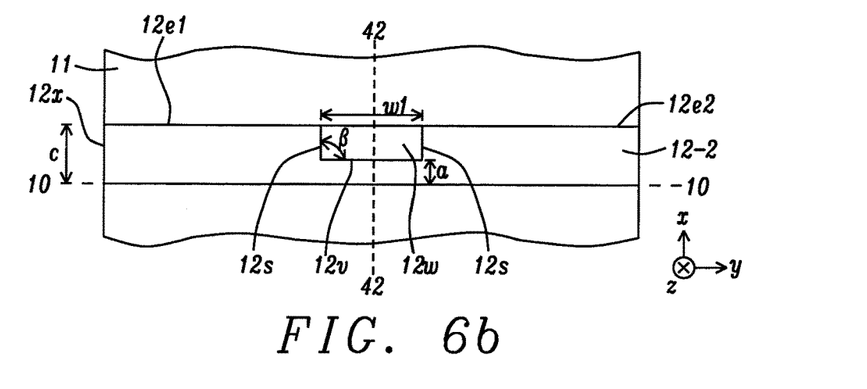

Referring to FIG. 6b, a top-down view of the partially formed patterned leading shield structure in FIG. 6a is shown. Angle β is formed between each side 12s and side 12v. Moreover, side 12v is recessed a distance a from the eventual ABS 10-10, and backsides 12e1, 12e2 are established for LS upper layer 12-2.

Figure 7:
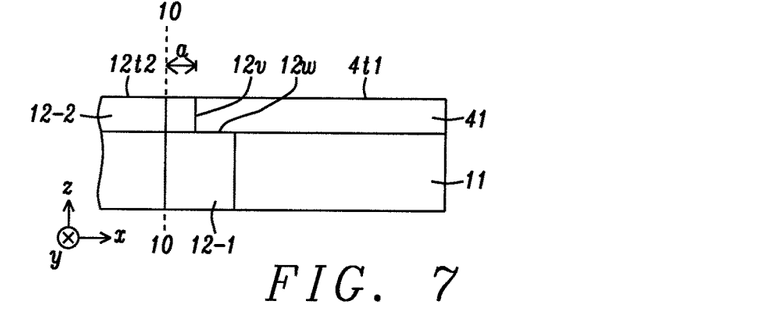
FIGS. 7-10 are down-track cross-sectional views showing a second sequence of steps in forming a patterned leading shield layer with a notch according to a first embodiment of the present disclosure.

In FIG. 7, the partially formed patterned leading shield structure is illustrated after a dielectric layer 41 is deposited on top surfaces 12t2, 12w and 11t by a chemical vapor deposition (CVD) or plasma enhanced CVD method, for example. The dielectric layer may be comprised of $SiO_2$, $Al_2O_3$, or the like. Thereafter, a chemical mechanical polish (CMP) method is employed to form dielectric layer top surface 41t that is coplanar with LS upper layer top surface 12t2.

Figure 8:
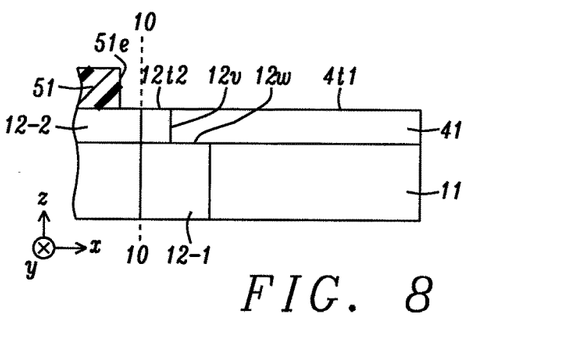

Referring to FIG. 8, a second photoresist layer 51 is coated on the top surface 12t2 of LS upper layer 12-2 and on dielectric layer top surface 41t. The photoresist is patternwise exposed and developed to form a pattern comprising a backside 51e that is on an opposite side of plane 10-10 with respect to dielectric layer 41. Accordingly, a portion of top surface 12t2 is uncovered between backside 51e and the ABS, and all of top surface 41t is uncovered as well as top surface 12t2 between the dielectric layer and the eventual ABS.

Figure 9:
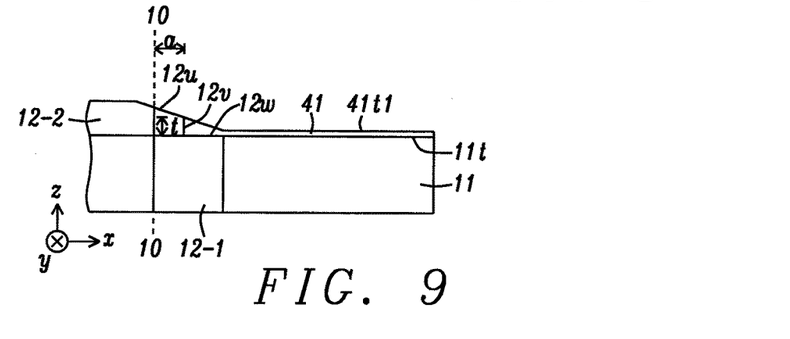

Referring to FIG. 9, the partially formed leading shield structure in FIG. 8 is shown after a conventional ion beam etch (IBE) is performed in which ions are directed at an angle of 15° to 75° with respect to the z-axis. The IBE stops before reaching top surface 11t such that a certain thickness of dielectric layer 41 remains below top surface 41t1, and between LS upper layer side 12v and a back end of the device. Side 12v has a thickness t that is less than the thickness of LS upper layer 12-2 at plane 10-10. As a result of the angled etch, tapered side 12u is formed as the top surface of LS upper layer 12-2. A conventional process is used to remove any remaining photoresist. Thereafter, the lead gap (not shown) is formed on tapered side 12u and on dielectric layer top surface 41t.

Figure 10:
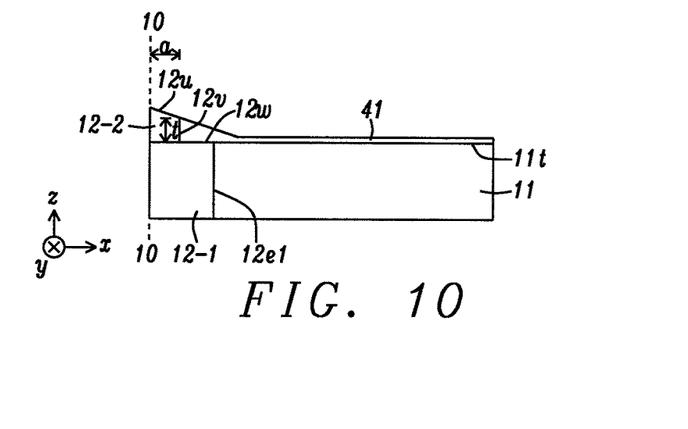

In FIG. 10, the completed leading shield structure is shown after all PMR writer layers have been formed by conventional methods, and a lapping process is employed to determine the position of ABS 10-10. Overlying layers in the PMR writer are depicted in FIG. 1 according to one embodiment, and are not shown in FIG. 10 in order to focus on the leading shield layout.

In order to demonstrate the advantages of the patterned leading shield design of the present disclosure, a simulation was performed to compare a POR leading shield reference with that of an embodiment described herein. In both of the reference (POR leading shield) and the patterned leading shield, the design parameters are the following: cross-track width w of 14 microns; height c of 150 nm; and a leading shield made of a 12 kG material. The main pole has a track width of 45 nm. According to an embodiment described with respect to FIGS. 3a-3c, the patterned leading shield has a notch with 90° sidewalls that is recessed 50 nm from the ABS (height a), has a cross-track width w1 of 200 nm, and a down-track depth t of 62.5 nm.

Figure 11A:
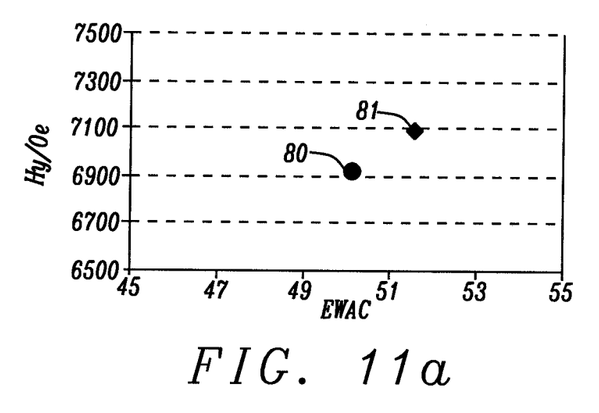
FIG. 11a is a graph showing the results of Hy field vs. erase width in an AC field mode (EWAC) for a PMR writer having a conventional leading shield, and with a patterned leading shield according to an embodiment of the present disclosure.
Figure 11B:
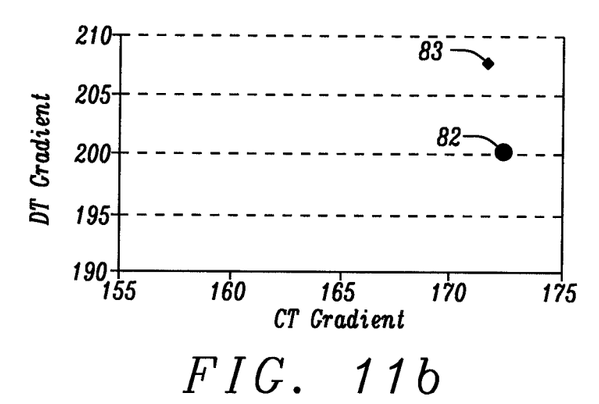
FIG. 11b is a graph showing the results of down-track gradient vs. cross-track gradient for a PMR writer having a conventional leading shield, and with a patterned leading shield according to an embodiment of the present disclosure.

Referring to FIG. 11a, Hy field on the recording media is plotted vs. erase width in AC mode (EWAC) for a PMR writer with the leading shield reference (point 80), and for the patterned leading shield embodiment (point 81) depicted in FIGS. 3a-3c. Finite-element-method (FEM) simulation results indicate the patterned leading shield enables a PMR writer with greater field strength. Moreover, in FIG. 11b where down track field gradient is plotted vs. cross-track field gradient for the POR reference (point 82) and for the patterned leading shield (point 83) described previously, higher down-track field gradient is observed for the patterned leading shield while cross-track field gradient is substantially maintained. Accordingly, the simulation results indicate a PMR writer with a patterned leading shield of the present disclosure will provide higher OW and BPI while TPI is substantially maintained.

Figure 12A:
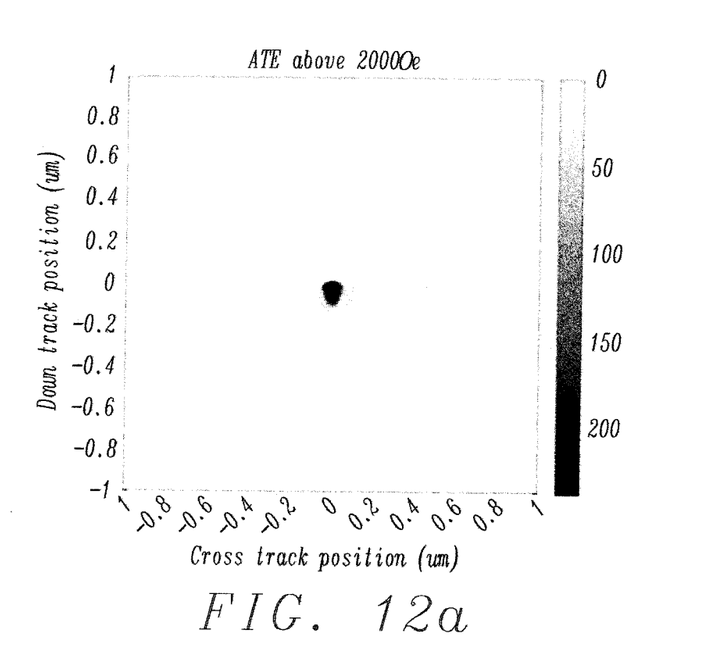
FIG. 12a is a graph showing ATI mapping as a function of down-track and cross-track positions for a PMR writer with a conventional leading shield.
Figure 12B:
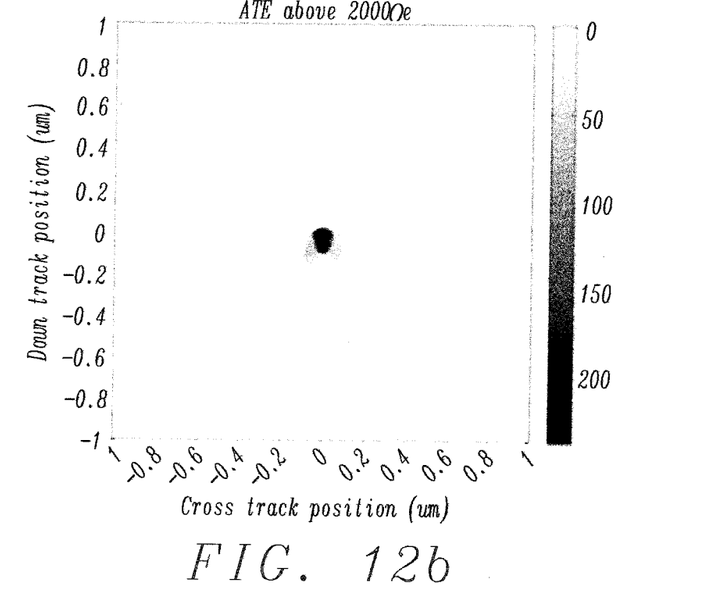
FIG. 12b shows similar ATI mapping for a PMR writer with a patterned leading shield according to an embodiment of the present disclosure.

FIG. 12a depicts a simulation result of ATI mapping for a PMR writer with a POR leading shield structure. FIG. 12b shows a simulation result of ATI mapping for a PMR writer with a patterned leading shield with the design parameters mentioned above. Micromagnetic simulation results reveal there is no significant difference between FIG. 12a and FIG. 12b which means ATI is maintained when replacing a POR leading shield design with a patterned leading shield described herein.

Figure 13A:
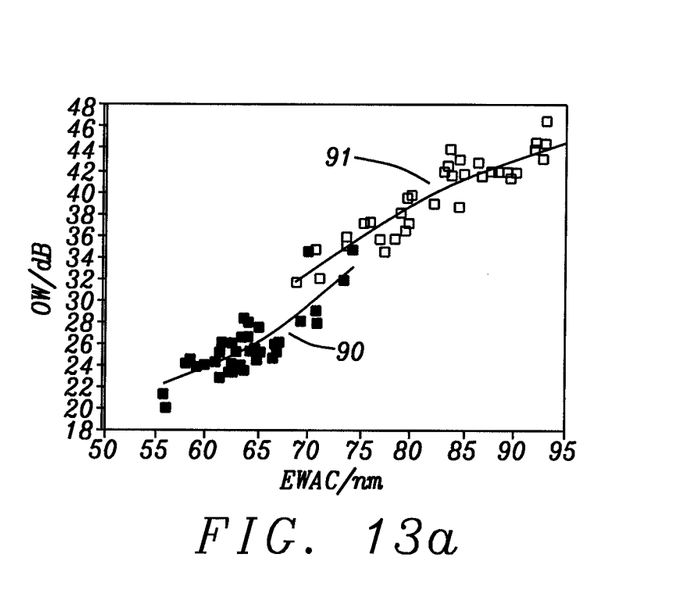
FIG. 13a is a graph showing spinstand data in terms of overwrite vs. EWAC for a PMR writer with a conventional leading shield, and with a patterned leading shield according to an embodiment of the present disclosure.
Figure 13B:
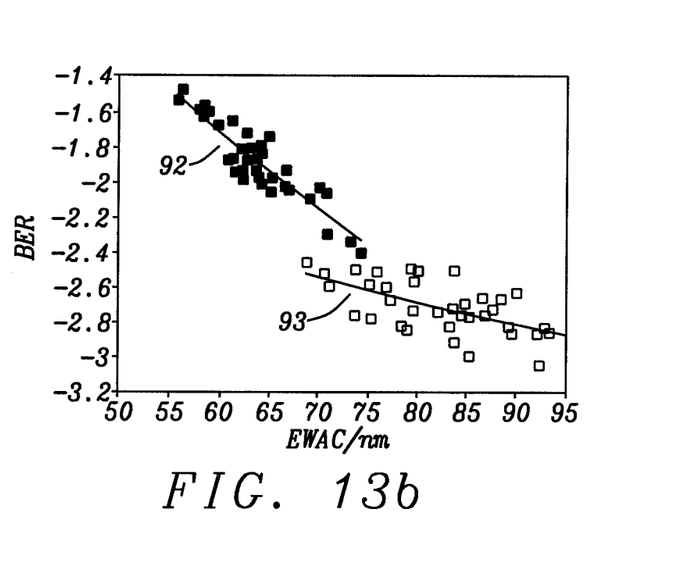
FIG. 13b is a graph showing spinstand data in terms of BER vs. EWAC for a PMR writer with a conventional leading shield, and with a patterned leading shield according to an embodiment of the present disclosure.

Referring to FIG. 13a where OW is plotted vs. EWAC, spinstand data is shown for a PMR writer having a POR leading shield design (curve 90), and for a PMR writer with a patterned leading shield described herein (curve 91). The patterned leading shield design affords an OW gain of about 2-3 dB. Meanwhile, BER is plotted vs. EWAC in FIG. 13b for the PMR writer with a POR leading shield (curve 92) and for a PMR writer with a patterned leading shield (curve 93) disclosed herein. There is a BER gain of 0.3 to 0.4 orders of magnitude shown by curve 93. Thus, both OW and BER are improved by incorporating a patterned leading shield of the present disclosure in a PMR writer.

While the present disclosure has been particularly shown and described with reference to, the preferred embodiment thereof, it will be understood by those skilled in the art that various changes in form and details may be made without departing from the spirit and scope of this disclosure.

We claim:

1. A perpendicular magnetic recording (PMR) writer, comprising:
    (a) a main pole with a first leading side and a trailing side, and two sides that connect the first leading side with the trailing side, the first leading side adjoins a lead gap having a front side at an air bearing surface (ABS), and the trailing side has a track width at the ABS;
    (b) the lead gap that separates the first leading side and a leading shield; and
    (c) the leading shield with a lower layer having a first cross-track width (w), and a backside at a first height (c) from a front side thereof at the ABS, and an upper layer formed on a top surface of the lower layer wherein the upper layer comprises:
        (1) a front side having the first cross-track width (w) at the ABS;
        (2) a second side contacting the lead gap, the second side is formed substantially parallel to the first leading side and has a front end at the ABS and a back end at the first height from the ABS, and wherein the second side comprises a notch that is recessed a second height (a) from the ABS and has a second cross-track width (w1) between two notch sidewalls that are equidistant from a center plane that bisects the leading shield and the main pole, and where w1<w, and wherein the notch has a first notch side that is formed parallel to the ABS and has a first down-track thickness, and the notch has a second notch side that extends from an end of the first notch side to a backside of the upper layer at the first height, and wherein each of the two notch sidewalls intersect the first notch side at an angle from about 90 to 170 degrees such that a distance between the two notch sidewalls at the upper layer backside is >w1 where w1 is the cross-track width at the second height; and
        (3) the backside that is aligned parallel to the ABS.

2. The PMR writer of claim 1 wherein the first leading side is tapered and the main pole is further comprised of a second leading side aligned orthogonal to the ABS, the second leading side has a front end connecting with a back end of the first leading side at a third height (k) from the ABS.

3. The PMR writer of claim 2 wherein k>c.

4. The PMR writer of claim 1 wherein the leading shield is made of CoFe, CoFeNi, FeNi, or CoFeN that is a 10-19 kG material.

5. The PMR writer of claim 1 wherein the first cross-track width is about 100 nm to 1 micron.

6. The PMR writer of claim 1 wherein the first down-track distance is about 20 nm to 200 nm.

7. The PMR writer of claim 1 wherein the second height is about 20 to 120 nm.

8. The PMR writer of claim 1 wherein the first height is about 100 to 300 nm.

9. The PMR writer of claim 1 further comprised of a write gap on the trailing side at the ABS, a side gap on each of the two sides with a side shield contacting each side gap, and wherein each side shield adjoins a top surface of the leading shield upper layer and contacts a bottom surface of a trailing shield to provide an all wrap around (AWA) shield structure.

10. The PMR writer of claim 1 wherein the patterned leading shield has a damping parameter α≥0.04 and is comprised of an alloy that is one of FeNiM, FeCoM, and FeCoNiM where M is one of Re, Os, Ir, Rh, Ti, Ta, V, Cr, W, Mn, Mo, Cu, Zr, Nb, Hf, Ru, Pd, Pt, Ag, and Au, and the M content is about 3 to 15 atomic % in the alloy.

11. A perpendicular magnetic recording (PMR) writer, comprising:
  (a) a main pole with a first leading side and a trailing side, and two sides that connect the first leading side with the trailing side, the first leading side adjoins a lead gap having a front side at an air bearing surface (ABS), and the trailing side has a track width at the ABS;
  (b) the lead gap that separates the first leading side and a leading shield; and
  (c) the leading shield with a lower layer having a first cross-track width (w) between a first far side and a second far side, and a backside at a first height (c) from a front side thereof at the ABS, and an upper layer formed on a top surface of the lower layer wherein the upper layer comprises:
    (1) a front side having the first cross-track width (w) at the ABS;
    (2) a second side contacting the lead gap, the second side is formed substantially parallel to the first leading side and has a front end at the ABS and a back end at the first height from the ABS, and wherein the second side comprises a curved notch having a curved section with a front portion that is recessed a second height (a) from the ABS, and wherein the curved notch has a second cross-track width (w1) between two sidewalls that are equidistant from a center plane that bisects the leading shield and the main pole, and where w1<w, and wherein the curved notch extends from the second side to a backside of the upper layer at the first height; and
    (3) the backside that is aligned parallel to the ABS, and wherein the upper layer backside on each side of the notch is parallel to the ABS between the first and second far sides.

12. The PMR writer of claim 11 wherein the first leading side is tapered and the main pole is further comprised of a second leading side aligned orthogonal to the ABS, the second leading side has a front end connecting with a back end of the first leading side at a third height (k) from the ABS.

13. The PMR writer of claim 11 wherein the leading shield is made of CoFe, CoFeNi, FeNi, or CoFeN that is a 10-19 kG material.

14. The PMR writer of claim 11 wherein the first cross-track width is about 100 nm to 1 micron.

15. The PMR writer of claim 11 wherein the curved notch has a down-track dimension of about 20 nm to 200 nm.

16. The PMR writer of claim 11 wherein the second height is about 20 to 120 nm.

17. The PMR writer of claim 11 wherein the first height is about 100 to 300 nm.

18. The PMR writer of claim 11 wherein there is an angle of about 90 degrees between the center portion of the curved notch at the center plane and each of the two sidewalls.

19. The PMR writer of claim 11 further comprised of a write gap on the trailing side at the ABS, a side gap on each of the two sides with a side shield contacting each side gap, and wherein each side shield adjoins a top surface of the leading shield upper layer and contacts a bottom surface of a trailing shield to provide an all wrap around (AWA) shield structure.

20. The PMR writer of claim 11 wherein the patterned leading shield has a damping parameter α≥0.04 and is comprised of an alloy that is one of FeNiM, FeCoM, and FeCoNiM where M is one of Re, Os, Ir, Rh, Ti, Ta, V, Cr, W, Mn, Mo, Cu, Zr, Nb, Hf, Ru, Pd, Pt, Ag, and Au, and the M content is about 3 to 15 atomic % in the alloy.

* * * * *